United States Patent [19]

Peaslee et al.

[11] Patent Number: 5,218,674
[45] Date of Patent: Jun. 8, 1993

[54] HARDWARE BIT BLOCK TRANSFER OPERATOR IN A GRAPHICS RENDERING PROCESSOR

[75] Inventors: John M. Peaslee; Jeffrey C. Malacarne, both of Chino Hills, Calif.

[73] Assignee: Hughes Aircraft Company, Los Angeles, Calif.

[21] Appl. No.: 582,694

[22] Filed: Sep. 14, 1990

[51] Int. Cl.$^5$ .................... G06F 15/00; G06F 15/20
[52] U.S. Cl. .................................. 395/166; 395/138; 395/162
[58] Field of Search ............... 395/137, 138, 165, 166, 395/162, 164

[56] References Cited

U.S. PATENT DOCUMENTS

| | | | |
|---|---|---|---|
| 4,672,680 | 6/1987 | Middleton | 395/138 |
| 4,837,563 | 6/1989 | Mansfield et al. | 395/166 |
| 4,845,656 | 7/1989 | Nishibe et al. | 395/166 |
| 4,916,301 | 4/1990 | Mansfield et al. | 395/162 |
| 4,958,303 | 9/1990 | Assarpour et al. | 395/164 |

Primary Examiner—Dale M. Shaw
Assistant Examiner—Kee M. Tung
Attorney, Agent, or Firm—W. K. Denson-Low

[57] ABSTRACT

A hardware bit block transfer operator for transferring blocks of data from a source address to a destination address in a display memory, a bit mapped memory, or a host processor, or between the two source and destination addresses in a graphics rendering cogenerator. Functionally, blocks to be transferred are addressable to the bit level thus requiring shifting and reformatting from the source word to the destination word alignment. The cogenerator automatically identifies all required boundary exceptions and applies the appropriate sequencing at the proper time during the block transfer operation. All that the programmer is required to provide are definitions of color depth, source transparency address, source start address, destination transparency address and destination window. The proper transfer is then performed by the cogenerator with a single command to the transfer operator.

7 Claims, 6 Drawing Sheets

HARDWARE BIT BLOCK TRANSFER OPERATOR IN A GRAPHICS RENDERING PROCESSOR

CROSS REFERENCE TO RELATED APPLICATIONS

The present application is related to contemporaneously filed patent applications: Ser. No. 07/582,697, filed on Sep. 14, 1990, entitled, "Multifunction High Performance Graphics Rendering Processor," Ser. No. 07/582,709, filed on Sep. 14, 1990, entitled "Dual Hardware Channels and Context Switching in a Graphics Processors," Ser. No. 07/582,710, filed on Sep. 14, 1990, entitled "Concurrent General Purpose and DMA Processing in a Graphics Rendering Processor,", Ser. No. 07/582,728, filed on Sep. 14, 1990, entitled "Hardware Generator for Integrated Area Fill, Conics and Vector Generator in a Graphics Processor", Ser. No. 07/582,694, filed on Sep. 14, 1990, entitled "Dual Programmable Block Texturing and Complex clipping in a Graphics Rendering Processor," Ser. No. 07/582,693, filed on Sep. 14, 1990, entitled "Hardware Symbology and Text Generator in a Graphics Processor," and Ser. No. 07/582,695, filed on Sep. 14, 1990, entitled "Multiprocess Scheduler in a Graphics Processor," all by John M. Peaslee and Jeffrey C. Malacarne, whose teachings are incorporated herein by reference.

BACKGROUND

The present invention relates generally to digital graphic display processors, and more particularly, to programmable integrated hardware for bit boundary block transfer operations, and a method of transferring rectangular blocks of data from a source address to a destination address, in a graphics rendering processors.

Real time digital electronic displays are used in many applications such as military command and control workstations and air-traffic control systems. In these displays, the displayed information typically comprises real-time processed data generated by a host processor adapted to receive the basic real-time information from one or more radars, communications systems and/or other data processors. These data are combined with one or more graphic primitives, such as a circle, ellipse or polygon, along with generated alphanumerics, mask areas and texture patterns to provide a relatively easily understood comprehensive graphic display on an output device such as cathoderay tube. In contemporary systems, the various components of the graphics display such as the graphic primitives, mask windows, fill texturing and the like are provided either by a general purpose computer based graphics generator or by a hardware specific graphics generator. Of these, general purpose graphics generators offer system versatility but usually must sacrifice some degree of system performance for ease of programming. On the other hand, hardware specific graphics generators, called cogenerators, provide good system performance.

Increasing demands on military command and control systems, military and civil air-traffic control systems and the like have created a need for high performance graphics cogenerators which, in addition, provide a versatile and easily implemented programming capability. One feature in such a cogenerator is the ability to easily and quickly transfer large blocks of data containing alphanumeric and other symbolic information from an internal memory to specific locations on the display screen. In contemporary graphics cogenerators, such "bit block transfer operators" typically provide limited hardware support for either data path or address generation, but not both. In such a case the programmer is required to create a routine which initializes and controls the hardware throughout the operation, often interacting on a word by word basis. Such an operation may be complicated by the fact that the number of source words and the destination required words may be different. It is therefore desirable to provide an integrated hardware means for efficiently and effective performing bit block transfer operations, with such operations requiring minimum input from the system operator.

SUMMARY OF THE INVENTION

In its broadest aspects, the bit boundary block transfer (BITBLT) operator of the present invention is a hardware based system adapted to provide a general purpose means for efficiently moving rectangular blocks of image data from one place to another within a memory space of an internal memory in a graphics cogenerator and from there to a specific pixel location within a bit mapped memory of a graphics generator. In the present system, these transfer operations are operator specified at a comparatively high level of operation. All that is required is the definition of color depth, source transparency address, source start address, destination transparency address and the destination window of the display. In operation, the proper transfer is then performed by the graphics cogenerator with a single BITBLT command.

A method of transferring a rectangular block of data from a source address to a destination address is also provided. The method comprises the steps of precalculating parameters required to perform nondestructive movement of a block of data from the source address to the destination address. The source and destination addresses are then generated. A block of data to be operated on is then retrieved. The block of data is then manipulated to reconfigure the block in accordance with the parameters. Finally, the manipulated, reconfigured block of data is transferred to the destination address.

BRIEF DESCRIPTION OF THE DRAWINGS

The various features and advantages of the present invention may be readily understood with reference to the following detailed description taken in conjunction with the accompanying drawings, wherein like reference numerals designate like structural elements, and in which.

DETAILED DESCRIPTION

Figure 1:
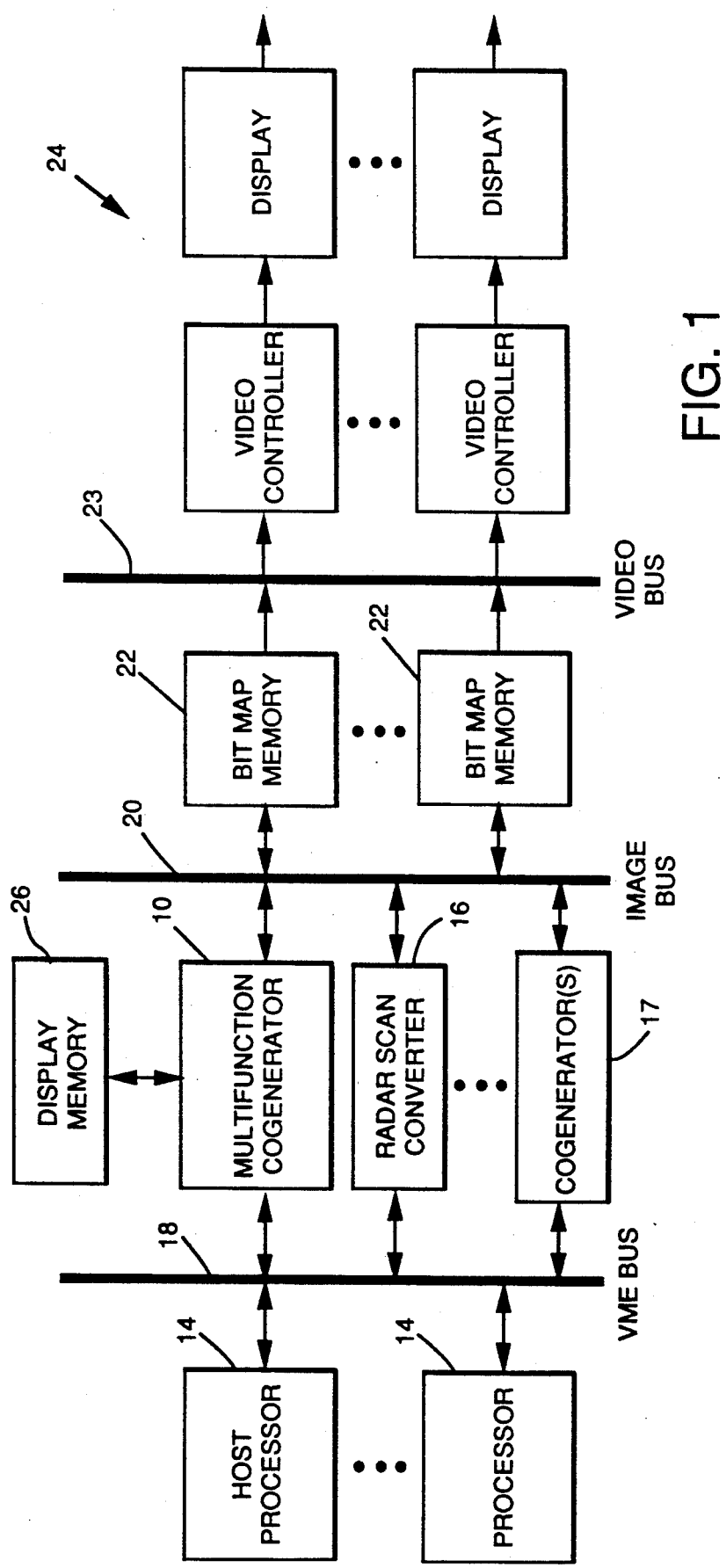
FIG. 1 is a basic block diagram of a system that incorporates a dual channel multifunction cogenerator of which the present invention forms a part.

Referring now to FIG. 1, there is shown a basic block diagram of a system incorporating a multifunction cogenerator 10 of which a bit boundary block transfer operator, also alternatively called a BITBLT address generator, of the present invention forms a functionally distinct part. The multifunction cogenerator 10 shown is a dual channel, high performance graphics rendering processor that provides unique solutions for a wide variety of graphics system applications. It is a hardware based device that operates in conjunction with one or more general purpose data processing systems such as a military command and control system, which further comprises one or more real time host processors 14 and other real time data accumulating devices, such as radar scan converter 16 or other cogenerators 17. The processors 14 and a radar scan converter 16 feed data into the cogenerator 10 via a multifunction bus 18, where they are combined with graphics data generated by the cogenerator 10. The combined data are then output as a complete set of data for the generation of a graphics display via a 64-bit bidirectional, multiuser, interconnect image bus 20 to a bit mapped memory 22 and then by way of a video bus 23 to a video display system 24.

In overview, the cogenerator 10 is a high performance single chip graphics rendering processor. As shown in the embodiment shown in FIG. 2, the cogenerator 10 is closely coupled to an internal tri-ported display memory 26, which stores all of the commands and parameters required for the cogenerator 10 to work properly, including appropriate logic. The cogenerator 10 has a memory address space of 4 megabytes by 32 bits in a working embodiment. In operation, the cogenerator 10, under the command of the host processor 14, fetches instructions from the display memory 26, processes these commands to calculate and then "draw" the processed signals representing the calculated figure into the bit mapped memory 22 via the image bus 20. Drawing is performed by entering a set of binary 1 and 0 signals into individual selected memory locations of the bit mapped memory 22. As a functionally distinct part of the cogenerator 10, an area fill generator 27 creates digital signals representing graphics primitives such as polylines, rectangles, circles, ellipses and polygons and area fills therefor. These primitives are next combined with other digital signals representing alphanumeric and other symbols, which are generated in a symbol generator 28, with yet a third set of signals generated by a block texturing clipper 30 to produce the final set of signals which is then transferred by the BITBLT address generator 12 of the present invention into a specified pixel address in the bit mapped memory 22. Typically, the bit mapped memory has multiple memory layers which set the color and intensity for the graphics display defined for each pixel location therein.

The display memory 26 is accessible by a display list processor (DLP) 32, internal graphics generator 34 and the host processor 14. The host processor 14 is adapted to read and write to the cogenerator 10 and to perform random reads and writes at any address within the display memory address 26 space. The cogenerator 10 monitors the input of data from the host processor 14 to synchronize updating of from the host processor 14 with the output of graphics signals therefrom. A display memory interface unit (DMIU) 36 performs the actual memory cycles within the display memory 26. The display memory interface unit 36 is a tri-port memory controller.

As a part of the display memory 26 are two first in, first out (FIFO) memory buffers 38, 40, having one of these being assigned a higher priority than the other, and having one buffer for each of two drawing channels. An address stack is provided internally within each buffer 38, 40 to store subroutines calls, as is an attributes stack to store all internal attributes needed by the cogenerator 10 for hardware context switching, a sin/cosine table for drawing conics graphics primitives, up to about 128 font tables to draw both stroked and dot-matrix symbols and characters and a large display list region. A more detailed description of the multifunction graphics cogenerator being described generally herein, is contained in copending commonly assigned U.S. patent application, Ser. No. 07/582,697, filed on Sep. 14, 1990, entitled "Multifunction High Performance Graphics Rendering Processor," the teachings of which are incorporated herein by reference.

The dual channel FIFO buffers 38, 40 interface the the cogenerator 10 to the host processor 14. The FIFO buffers 38, 40 are used to store cogenerator commands that are sent by the host processor 14. The display memory interface unit 36 performs read and write operations to the display memory for the host processor 14. The FIFO buffers 38, 40 are also responsible for arbitrating high and low priority signals coming into the cogenerator 10, and whenever a higher priority signal is received, the system will interrupt whatever it is doing to process that signal. At the conclusion of such processing, the system then resumes the processing of the interrupted signal. A more detailed description of these functions is contained in copending commonly assigned U.S. patent application, Ser. No. 07/582,709, filed on Sep. 14, 1990, entitled "Dual Hardware Channels and Context Switching in a Graphics Processor," the teachings of which are incorporated herein by reference.

The display list processor 32 performs all command and display list processing for the cogenerator 10. Typically, commands are sent thereto from the host processor 14, which handles the various ways commands can be sent. The display list processor 32 further interfaces to display memory 26 using the display memory interface unit 36, reads commands from the FIFO buffers 38, 40, or processes commands and routines from the display list region of the display memory 26, as well as performing other functions. Basically, when a command is given to the display list processor 32, it is responsible for determining what action is next required and initiating that action in the system.

Context registers 42 store cogenerator attributes which define the current state of the cogenerator 10. These include the cogenerator operational mode, draw pointer position, foreground color, background color, clipping window dimensions, etc. These attributes are important, for they define the personality of the cogenerator 10 at any given time and all of them are user programmable. This gives a user a considerable degree of flexibility in operating the display system.

Also provided is a readback multiplexer 42, which is a large data multiplexer. It is used to multiplex data to the display memory interface unit 36 from which is then directed either to the display memory 26 or to the host processor 24 via the data bus 18. Three sources of readback data are the context registers 42, the graphics generator 34 and the block texturing and complex clipping processor 30. If the data are intended for the host processor 14, they will be sent through the FIFO buffers 38, 40 by the display memory interface unit 36.

Figure 2:
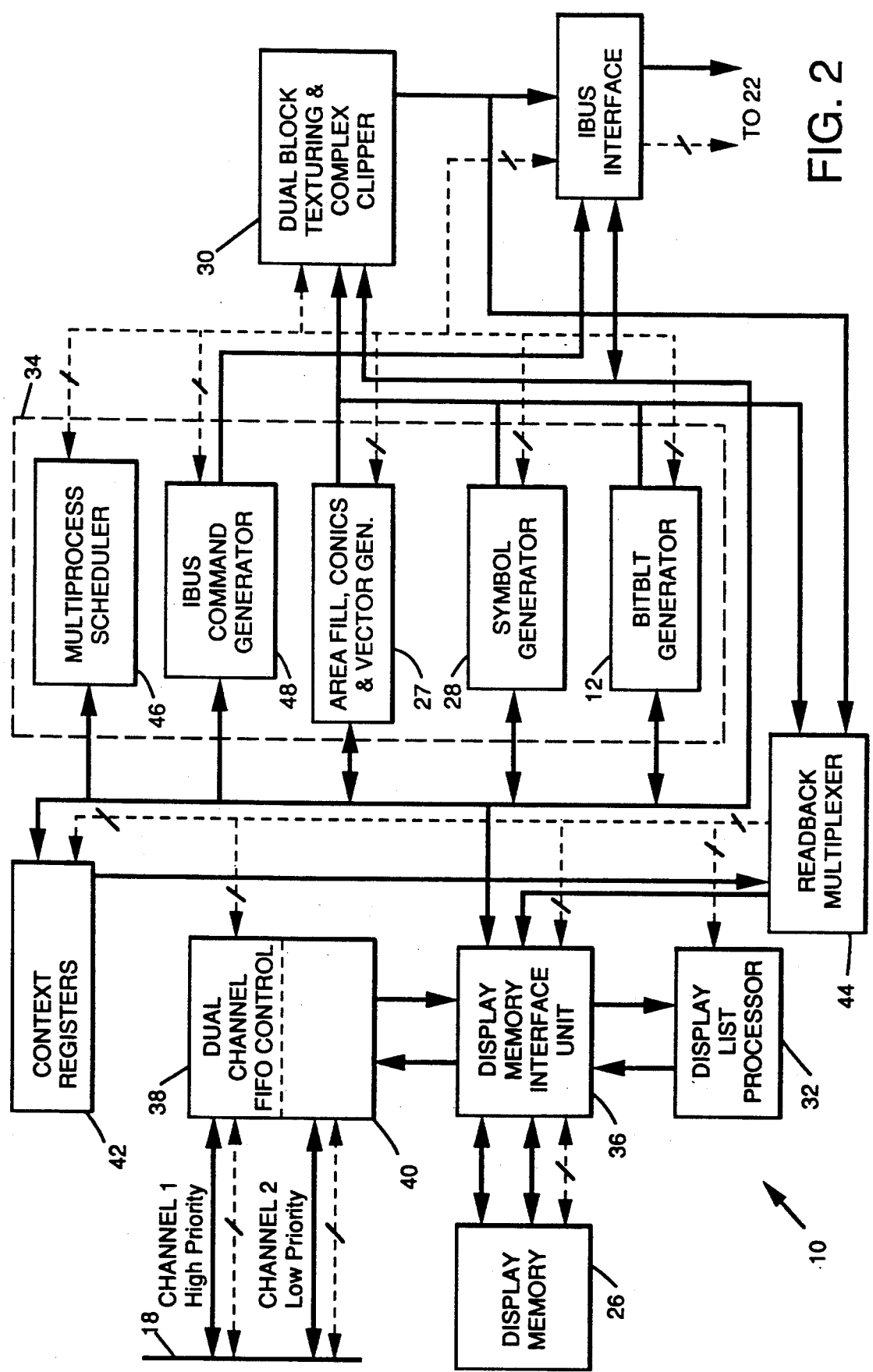
FIG. 2 is a detailed block diagram of the multifunction cogenerator of FIG. 1, of which the present invention forms a part.

That part of cogenerator 10 which is responsible for the actual generation of the primitives and symbols used is shown in the dotted block of FIG. 2, identified as block 34. To perform its many functions, there are included within block 34, along with the BITBLT operator 12 of the present invention, a multiprocess scheduler 46, a command generator 48, the area fill, vector and conics generator 27 and the symbol generator 28. The multiprocess scheduler 46 controls all data transfers between the elements within block 34, the command generator 48 enables image bus 20 to receive output data and transport it to bit mapped memory 22, area fill generator 27 creates polylines, vectors, rectangle and conics primitives and fill lines for them, while the symbol generator 28 generates alphanumeric signals. Detailed discussions of these devices are given in copending, commonly assigned U.S. patent application, Ser. No. 07/582,728, filed on Sep. 14, 1990, entitled "Integrated Hardware Generator for Area Fill, Conics and Vectors in a Graphics Rendering Processor," Ser. No. 07/582,693, filed on Sep. 14, 1990, entitled "Hardware Symbology and Text Generator in a Graphics Generator," Ser. No. 07/582,710, filed on Sep. 14, 1990 entitled "Concurrent General Purpose and DMA Processing in a Graphics Rendering Processor", and Ser. No. 07/582,695, filed on Sep. 14, 1990 entitled "Multiprocess Scheduler in a Graphics Processor". Block texturing and complex clipper processor 30 receives the output signals from the symbol generator 28 and the area fill generator 27, combines them and then further processes the combined signal before it is sent to the bit mapped memory 22. The manner in which this done is discussed in greater detail in copending, commonly owned U.S. patent application, Ser. No. 07/582,694, filed on Sep. 14, 1990, entitled "Dual Programmable Block Texturing and Complex Clipping in a Graphics Rendering Processor." The contents of all of the above listed patent applications are incorporated herein by reference.

The bit block transfer operator 12, (or BITBLT generator 12) of the present invention provides a general purpose means for moving rectangular blocks of image data both between and within bit mapped memory 22, display memory 26, and the host processor 14. The multifunction cogenerator 10 supports BITBLT operations that transfer data from the bit mapped memory 22 to the bit mapped memory 22, from the bit mapped memory 22 to the display memory 26, from the display memory 26 to the display memory 26, from the host processor 14 to the bit mapped memory 22, or from the bit mapped memory 22 to the host processor 14.

In overview, the bit block transfer operator 12 of the present invention provides a general purpose means for moving rectangular blocks of image data within the memory space of the display memory 26, from display memory 26 to the bit mapped memory 22, and within the memory space of the bit mapped memory 22. In operation, data words being transferred are addressable to the bit level, which requires that the source words be shifted and reformatted to the destination word alignment. Often, however, the number of source and destination required words are different, and several unique boundary conditions, which are determined by the relative shift length, relative shift direction, and source boundary bit position, both within a given memory word destination boundary position and/or within a given memory word and block width, also exist. Consequently, such a transfer is much more complex than a simple "read source/write destination" operation.

To meet these often conflicting requirements, cogenerator 10 is configured to automatically identify all required boundary exceptions and to apply the appropriate sequencing at the proper time during block transfer operations. To avoid the destruction of source data during destination writes, when the source and destination blocks overlap, the cogenerator 10 is further adapted to use the relative move direction to automatically define a nondestructive scanning direction. For example, an overlapping block movement in the positive x and y direction must be scanned in the negative x and y direction to avoid writing to addresses that contain source information that has yet to be read. In the present invention, boundary condition and scan direction information are automatically derived and applied to the block transfer operation without interaction from the programmer. All that is required from the programmer is the definition of the color depth, source transparency address, source start address, destination transparency address and the destination window. With these definitions in hand, the proper transfer is then performed by the cogenerator 10 in its entirety by a single command to the BITBLT transfer operator 12. How all of this is done is shown functionally in FIG. 6, which is discussed in more detail below.

Figure 3:
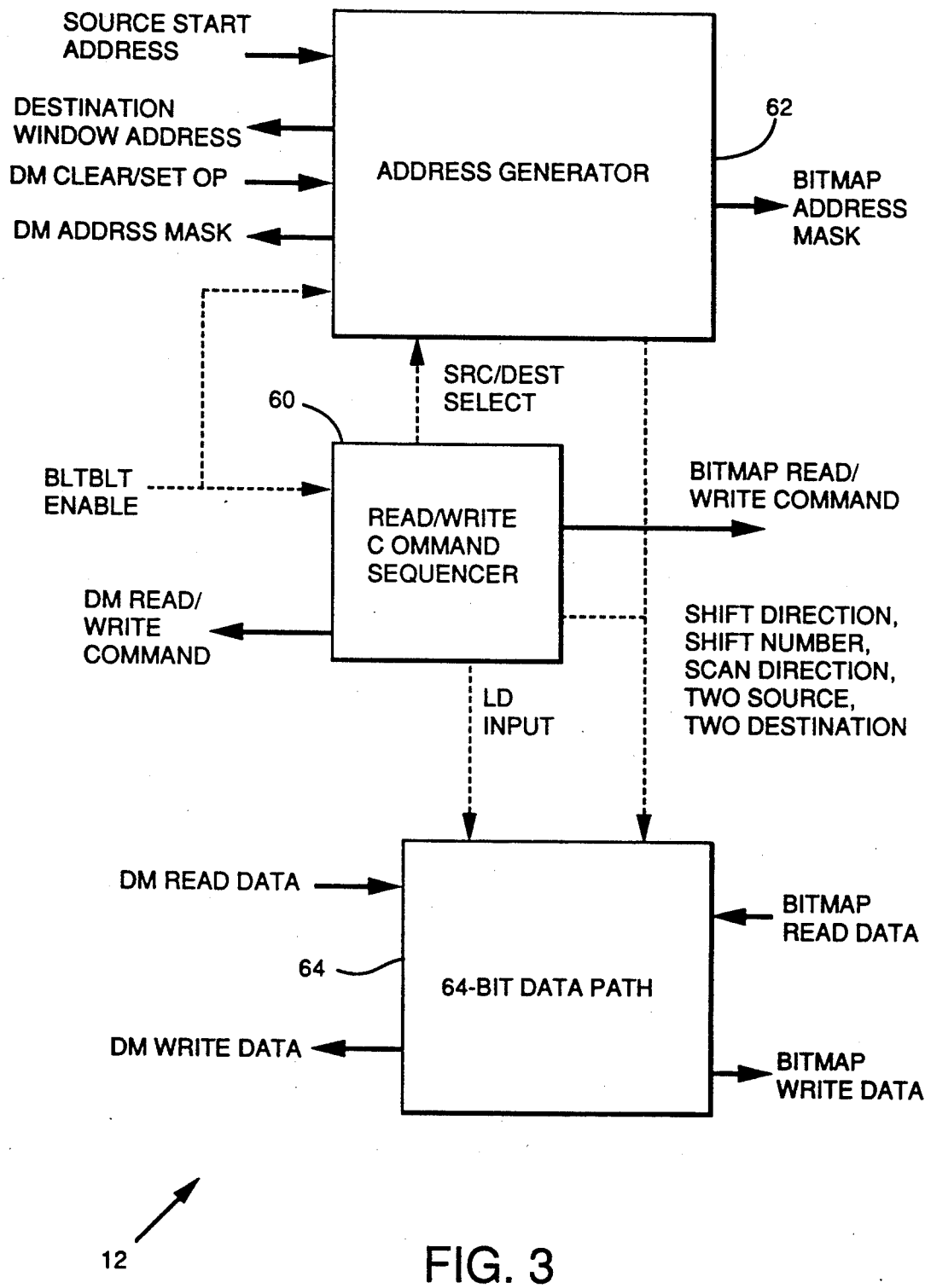
FIG. 3 is a top level block diagram of the integrated hardware BITBLT address generator of the present invention.

The block diagram of FIG. 3 shows a top level diagram of the bit boundary block transfer operator 12 of the present invention. As shown, the BITBLT operator 12 comprises three major functional blocks; a read/write command sequencer 60 comprising data manipulation means, an address generator 62, and a 64-bit data path 64. Functionally, the read/write command sequencer 60 generates all requests for external memory cycles to the display memory 26 and the bit mapped memory 22. While a word aligned block transfer may involve only simple READ/WRITE cycles, non-word aligned transfers may involve boundary exceptions and thus require additional cycles to collect or output the necessary data. For example, data from two source words may be required to form the first destination word of each horizontally scanned line. The macrosequence which controls the individual microsequences for each READ and WRITE CYCLE control generation then becomes READ/READ/WRITE. Also, a given situation may require that the data from one source word be read into two destination words and, in this event, the macrosequence becomes READ/WRITE/WRITE. As a practical matter, all permutations of one or two reads and writes are required to support arbitrary bit boundary mappings between source and destination data. To provide this capability, the read/write command sequencer 60 inputs two flags from the address generator 64 that indicate whether two source or two destination words are required for the current macro cycle.

Figure 4:
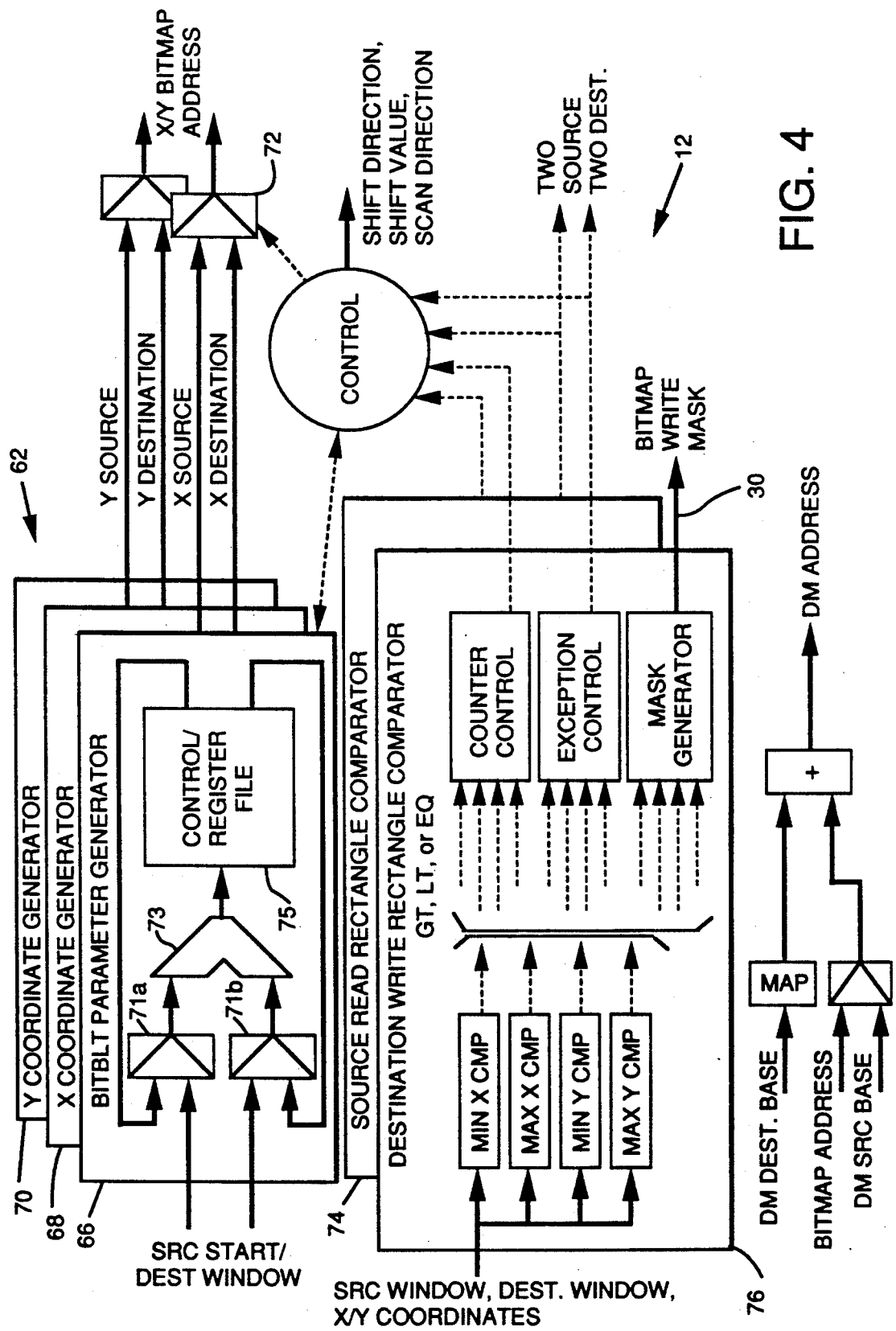
FIG. 4 is a more detailed block diagram of the integrated hardware BITBLT address generator of FIG. 3.

In the present invention, the address generator 62 outputs all of the addresses for the bit mapped memory 22 and the display memory 26 for source reads and destination writes. As shown in FIG. 4, which shows the BITBLT operator 12 in more detail, source window start coordinates and destination start/end coordinates are input into a bank of three arithmetic logic unit (ALU)/counter functions. Each are similarly configured and include two multiplexers 71a, 71b, an arithmetic logic unit 73 and a register file 75. These functions form a BITBLT parameter generator 66, an x coordinate generator 68, and a y coordinate generator 70.

Functionally, the parameter generator 66 uses the input window specifications to create internal controls that set up scan, shift, and exception control outputs. The scan direction is determined by comparing the relative positions of the upper left corners of the source and destination windows. The shift value is determined by subtracting the 4 least significant bits of the upper left hand x coordinates of the destination address from the source address. Two source and two destination exception controls are determined by comparing the number of 16-bit words required by each window. If the numbers are equal, either no exception or both exceptions exist and the shift direction will determine which is the case. If the numbers are not equal (they must, however, be within 1), then either a two source or two destination exception is required. If the source window requires one more word, then a two source exception exists and if the destination window requires one more word, then a two destination exists. The x and y coordinate counters 68, 70, that comprise coordinate generation means, contain the counters for both the source and destination addresses. The source and destination address output for both x and y are independently multiplexed in the multiplexers 71a, 71b to form a single x/y bitmap address output. The bitmap address output is then mapped into the address space of the display memory 26 and offset with the appropriate source or destination display memory base address. For BITBLT operations within the bit mapped memory 22, the bitmap address output is used for both the source and destination. For BITBLT operations within the display memory 26, only the display memory addresses are used. Finally, for transfer operations between the memories 22, 26, the proper corresponding source and destination addresses are used.

In operation, the current x/y address is monitored and compared with the source and destination window definitions in source and destination comparators 74, 76. The output of these comparisons is used for x/y counter and exception control. For exceptions, the fact that a two source or two destination exception exists is calculated at the beginning of the transfer operation by the parameter generator 66. The exception control function determines when to apply the extra memory cycle by detecting that the appropriate boundary has been reached. The mask generator 30 is used during destination writes to the bit mapped memory 22 to clip at the left and right window boundaries.

Figure 5:
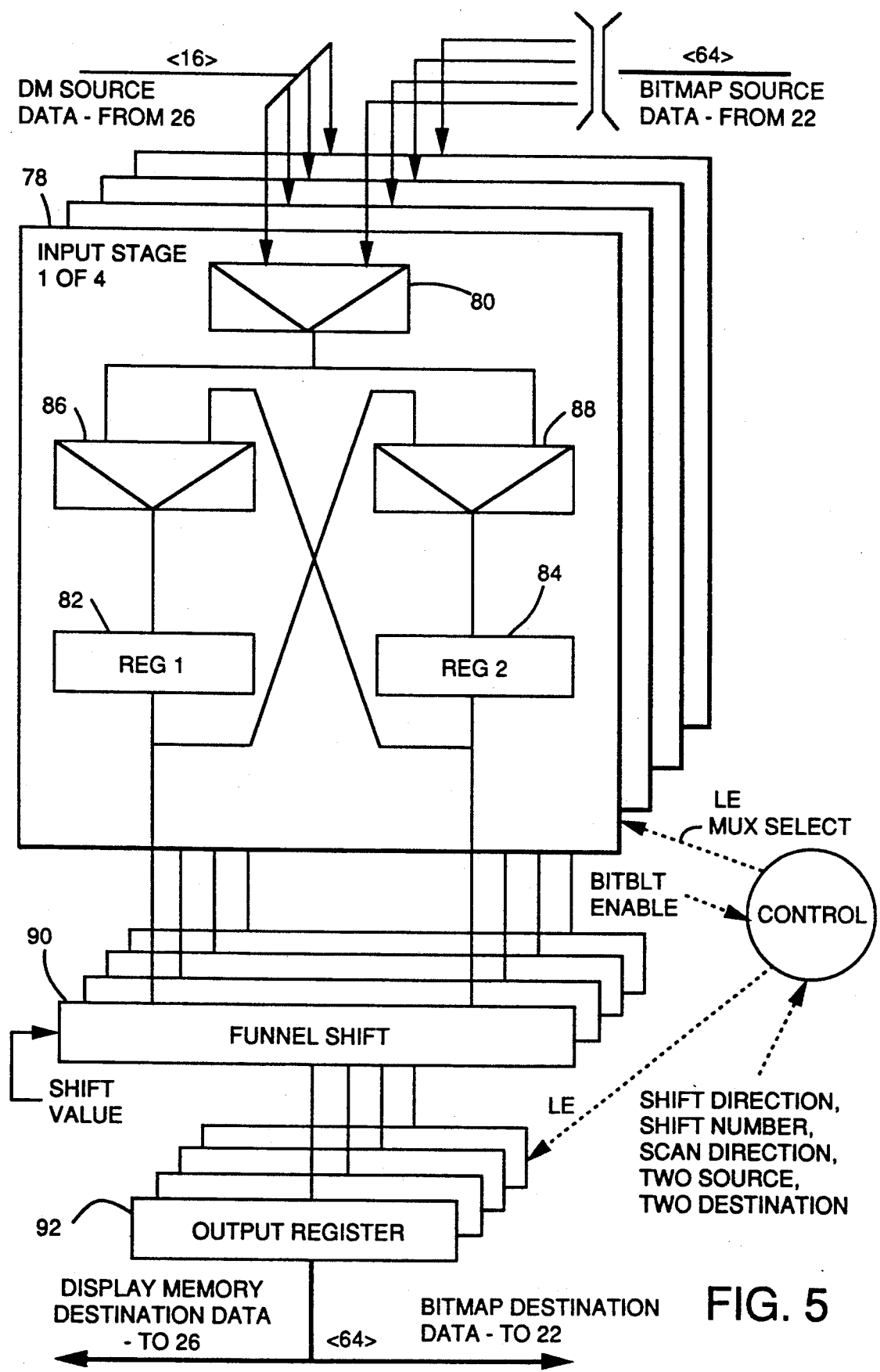
FIG. 5 is a data path block diagram of the BITBLT generator of FIG. 3.

The functional operation of 64-bit data path 64 is shown in FIG. 5. Basically, it inputs source image data from either the display memory 26 or the bit mapped memory 22 and performs bit-level shifting to produce properly aligned destination image data. A compact hardware architecture is used to set up all the data paths necessary for the required scan directions, boundary exceptions and source data caching. The input stage consists of four identical functional units 78 that process 16 bits of data each. An input multiplexer 80 selects between display memory and bitmap memory source data. This is followed by a bidirectional, two-stage pipeline with all outputs exposed. The direction in which the pipeline is loaded (into REG1 82 or REG2 84 first) is subject to the horizontal scan direction of the BITBLT operation and special boundary exceptions. Two registers 86, 88 are required to hold the maximum number of source words that are required to form a single destination word. The register pair serves as a caching pipeline for source data since the data in the REG1 82 used in the current operation may be loaded into the REG2 84 and used again for the next operation. This caching prevents double fetching of any source data.

In one embodiment of the present invention, up to four bits of color depth is processed per pixel per cycle. Pixels with color depths greater than four are processed in blocks of four, with each four-bit block being completed in x/y before moving on to the next four bits to be processed. This approach improves overall performance by maintaining the caching in the x direction for all operations. As shown in FIG. 5, the input stage outputs four 32-bit words to four unidirectional funnel shifters 90. Bidirectional shifting is achieved by the order in which the source data are loaded into the input stage. For example, a shift right may be performed directly by the funnel shifter 90. Since the pipeline basically performs a 16-bit shift in either direction, a shift left is achieved by performing an input stage shift left by 16 bits and a funnel shift right by a 16-bit-shift-left value. The output of each funnel shifter 90 is loaded directly into an output register 92 for output to either the display memory 26 or to the bit mapped memory 22.

Figure 6:
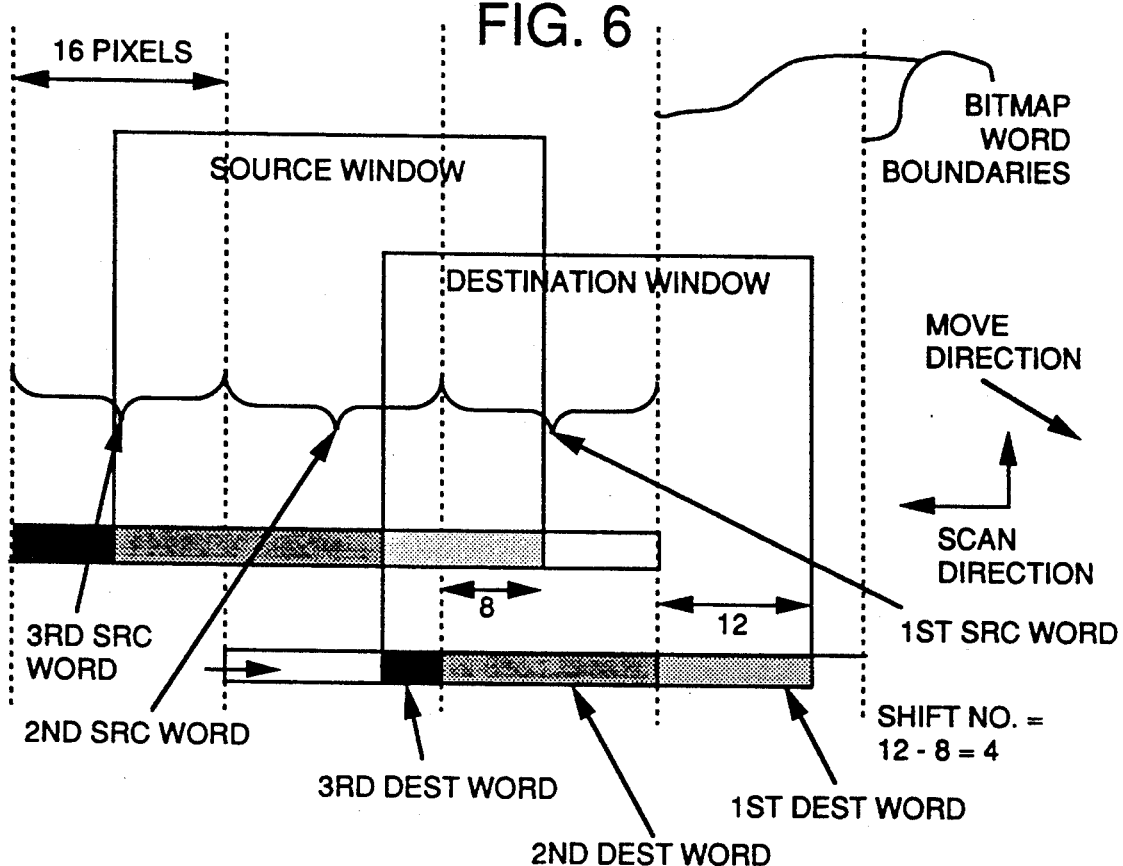
FIG. 6 is an illustration of BITBLT data formatting.
Figure 6:
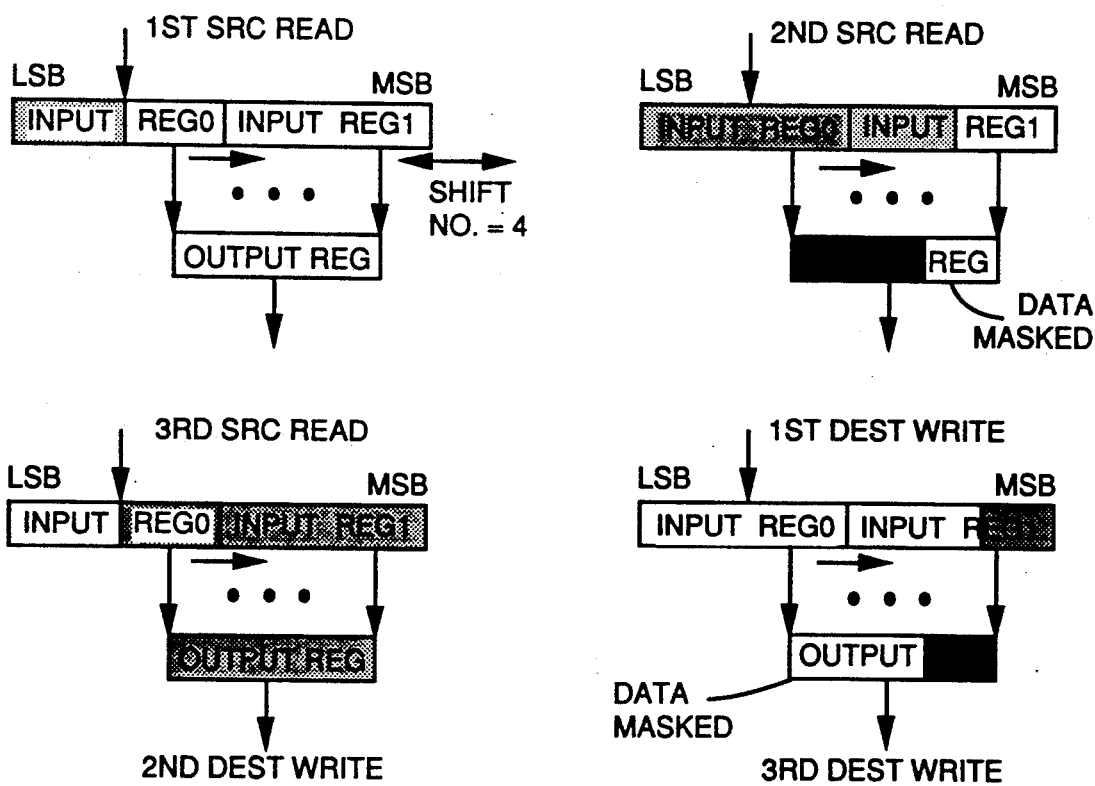

An example of a typical data formatting action of the BITBLT operator 12 is illustrated in FIG. 6. The source window illustrates the region of data to be moved. The destination window represents the region to place the data with 16-bit pixel memory word boundaries being used to define the resolution of data access. The move direction is determined by comparing the coordinates of the upper left hand corners of the source and destination windows. This move direction defines an x/y scan direction that must be used to avoid overwriting any unmoved source data. The shift number is next determined by comparing the relative bit positions of the source and destination start coordinates within the 16-bit pixel memory word. These parameters are all precalculated in hardware by the address generator 62 and once they are set up, the data transfer begins. The example illustrated shows a two-source/two-destination boundary exception situation. The first destination word requires 12 pixels, but only 8 pixels are read in the first source word. Two source words are therefore required to form the first destination word. The data path funnel shifter 90 determines which 16-bits of each 32-bit source register is to be loaded into the output registers 94. After the first destination word is output, the second source word is shifted over and the third source word is loaded. The bits of the second source word that are unused in forming the first destination word are now used in forming the second destination word. This pipelining continues until the last source word is input, at which time an additional destination output word is generated to clear all valid data from the source register.

In view of the above, it should be apparent that a method of transferring a rectangular block of data from a source address to a destination address is also provided by the present invention. The method comprises the steps of precalculating parameters required to perform nondestructive movement of a block of data from the source address to the destination address. The source and destination addresses are then generated. A block of data to be operated on is then retrieved. The block of data is then manipulated to reconfigure the block in accordance with the parameters. Finally, the manipulated, reconfigured block of data is transferred to the destination address.

Thus there has been described a new an improved BITBLT transfer operator and method of transferring a rectangular block of data from a source address to a destination address for use in a graphics rendering processor. It is to be understood that the above-described embodiment is merely illustrative of some of the many specific embodiments which represent applications of the principles of the present invention. Clearly, numerous and other arrangements can be readily devised by those skilled in the art without departing from the spirit and scope of the present invention.

What is claimed is:

1. A bit block transfer operator for use in a graphics display system that moves rectangular blocks of image data from a source address space to a destination address space, and wherein the source and destination address space are located in a display memory, a bit mapped memory, or a host processor adapted to generate system commands, said graphics display system further including means for displaying the data stored in said bit mapped memory, said operator comprising:

parameter generating means for precalculating parameters required to perform nondestructive movement of data from the source address space to the destination address space;

coordinate generating means for generating source and destination addresses, boundary conditions and a scan direction for the respective source and destination spaces that are respectively indicative of an overlap between the source and destination address spaces and a direction in which to write the destination block to avoid destruction of the image data;

command sequencer means coupled to said parameter generating means and said coordinate generating means for sequencing read and write commands to move said blocks of image data from said source address space to said destination address space; and data manipulation means coupled to said parameter generating means, said coordinate generating means and said command sequencer means for transferring said blocks of data from said source address and manipulating said blocks of data and then transferring said manipulated blocks of data to said destination address such that destruction of the image data is avoided.

2. The transfer operator of claim 1 wherein coordinate generating means further comprises means for combining data from two separate source addresses spaces to form one destination address space and means for distributing data from one source address space to two separate destination address spaces.

3. The transfer operator of claim 1 wherein said data manipulation means comprises a 64-bit bidirectional bus.

4. A method of transferring a rectangular block of data from a source address space to a destination address space, said method comprising the steps of:

precalculating parameters required to perform nondestructive movement of a block of data from the source address space to the destination address space;

generating source and destination addresses, boundary conditions and a scan direction for the respective source and destination spaces that are respectively indicative of an overlap between the source and destination address spaces and a direction in which to write the destination block to avoid destruction of the image data;

retrieving a block of data to be operated on;

manipulating the block of data to reconfigure the block of data in accordance with the parameters;

transferring the manipulated, reconfigured block of data to the destination address space such that destruction of the image data is avoided.

5. The method of claim 4 wherein the step of manipulating the block of data to reconfigure the block of data in accordance with the parameters comprises the steps of:

storing the block of data; and shifting the data in accordance with the parameters.

6. A bit block transfer operator for use in a graphics display system that moves rectangular blocks of image data from a source address space to a destination address space, and wherein the source and destination address spaces are located in a display memory, a bit mapped memory, or a host processor adapted to generate system commands, said graphics display system further including means for displaying the data stored in said bit mapped memory, said operator comprising:

parameter generating means for precalculating parameters required to perform nondestructive movement of data from the source address space to the destination address space;

coordinate generating means for generating source and destination addresses, and for combining data from two separate source addresses spaces to form one destination address space and means for distributing data from one source address space to two separate destination address spaces;

command sequencer means coupled to said parameter generating means and said coordinate generating means for sequencing read and write commands to move said blocks of data from said source address space to said destination address space; and data manipulation means coupled to said parameter generating means, said coordinate generating means and said command sequencer means for transferring said blocks of data from said source address space and manipulating said blocks of data and then transferring said manipulated blocks of data to said destination address space.

7. The transfer operator of claim 6 wherein said data manipulation means comprises a 64-bit bidirectional bus.

* * * * *